3,520,673
PLANT DESICCATING AND DEFOLIATING
COMPOSITIONS
James C. Campbell, Colonial Heights, and Harry E. Ulmer, Hopewell, Va., assignors to Allied Chemical Corporation, New York, N.Y., a corporation of New York
No Drawing. Filed Aug. 17, 1967, Ser. No. 661,224
Int. Cl. A01n 11/02
U.S. Cl. 71—69                                                     4 Claims

ABSTRACT OF THE DISCLOSURE

Compositions containing mixtures of water-soluble salts of peroxydisulfuric acid with water-soluble, nitrogen-containing fertilizers, useful for desiccating and defoliating crop plants. Such compositions may be applied in solid form to plants by dusting, or in aqueous solution by spraying, drenching, or immersion. Illustrative of the water-soluble, peroxydisulfates are potassium peroxydisulfate and ammonium peroxydisulfate. Illustrative of the water-soluble, nitrogen-containing fertilizers are sodium nitrate, ammonium sulfate and urea. The preferred desiccating and defoliating composition is an aqueous solution having as the essential active ingredient a synergistic combination of ammonium peroxydisulfate and a nitrogen fertilizer selected from the group consisting of sodium nitrate, ammonium sulfate, ammonium nitrate and urea. There is present 1 part of ammonium peroxydisulfate per 2–35 parts of nitrogen fertilizer.

BACKGROUND OF THE INVENTION

Our invention relates to compositions useful for desiccating and defoliating crop plants, and to the method of applying such compositions.

It has become a common practice among farmers who perform their harvesting operations with machinery to apply desiccating and/or defoliating agents to their crops prior to harvest. Such treatment facilitates mechanical separation of the produce from the leaves. In this way, harvesting time can be accelerated to avoid weather changes that would injure the crop or even destroy it if the crop were allowed to remain in the field. The general quality of the harvest is also improved. In the case of cotton farming, for example, there is less staining of the cotton fibers by chlohrophyll if the plant leaves are desiccated or removed prior to harvesting.

Another important advantage of defoliating or desiccating crop plants is that many plant pests and diseases located on the leaves can be more easily controlled. By drying up or removing the leaves of the plant, these desiccating and defoliating agents reduce the ability of these pests and diseases to survive and attack the fruit. Also, the first generation of pests and diseases would not only be controlled or eliminated, but there would be less opportunity for the production of a second generation of pests capable of attacking subsequent crops.

When a leaf is contacted with a defoliating agent, an "abscission layer" composed of meristemic cells will grow across the base of the leaf stem. This leaves the stem in a weakened condition, and the weight of the leaf or a slight breeze is then sufficient to disengage the leaf.

Deiscccating agents, on the other hand, act much more quickly. When contacted with a desiccating agent, the leaves of a plant quickly wither. This occurs before an abscission layer can grow across the base of the leaf stem. Consequently, the leaves, although in a dried out condition, remain tightly attached to the plant.

With proper control of operating conditions, defoliating and desiccating agents may be employed without killing the non-leafy portion of the plant.

Heretofore, defoliating was preferred over desiccation, but due to recent improvements in harvesting machinery and processing techniques, crop plants such as cotton, beans, potatoes, and sorghum may be satisfactorily harvested when their leaves are desiccated, rather than completely defoliated.

The desiccating and defoliating agents already in use are of limited value due to several drawbacks attending their use. Sodium arsenite, alkali metal chlorates, pentachlorophenol, cyanamides, and the like all leave residues which are harmful to the soil. Many of these compounds are potential fire and explosion hazards, while at the same time their desiccating and defoliating ability is such as to require at least two applications to achieve 80% effectiveness. Furthermore, it is not always possible to obtain complete success, particularly with respect to defoliation, by merely increasing the amount of active ingredient. This is because some leaves on a given plant are much more susceptible to defoliation than others. Consequently, it is much easier to achieve 40% to 60% defoliation than it is to carry the process to 90% or higher.

SUMMARY OF THE INVENTION

Accordingly, it is an object of our invention to provide compositions which are useful for desiccating and defoliating crop plants.

Another object of our invention is to provide plant desiccating and defoliating agents which do not leave residues that are harmful to the soil, which do not present fire and explosion hazards, and which are completely effective in a single application.

Yet another object of our invention is to provide plant desiccating and defoliating agents whose potency may be adjusted according to the type of plant being treated.

Further objects and a fuller understanding of our invention may be had by referring to the following description and appended claims.

We have found that crop plants may be easily and effectively desiccated and defoliated by treatment with an aqueous solution containing a water-soluble salt of peroxydisulfuric acid and a water-soluble, nitrogen-containing fertilizer.

The water-soluble peroxydisulfates suitable for use in our invention include the alkali metal (e.g. sodium and potassium) and ammonium salts of peroxydisulfuric acid, the above mentioned salts being in either neutral or acid form. Of these, ammonium peroxydisulfate is preferred.

The water-soluble, nitrogen-containing fertilizers for use in our invention may be any of various known fertilizers such as sodium nitrate, ammonium sulfate, ammonium nitrate, urea and the like. Mixtures of nitrogen-containing fertilizers are also effective. For example, we have found that fertilizer solutions containing a mixture of ammonium nitrate and urear (commercially available as "Uran") are very effective.

Nitrogen-containing fertilizers and water-soluble peroxydisulfates when applied as sole constituents are either ineffective or require large amounts to effect complete defoliation. Our invention resides in the discovery that when the water-soluble peroxydisulfates and the water-soluble, nitrogen-containing fertilizers are combined in the same composition, a synergistic effect results whereby the desiccating and defoliating action of the composition is highly effective at much lower concentration of active ingredients than would be required if each ingredient were to be applied in the absence of the other. As an added bonus, these compositions also nourish the soil and provide nitrogen and sulfur for the next crop.

We have observed the above synergism in the compositions of our invention when the weight ratio of peroxydisulfate to nitrogen-containing fertilizer lies between about 1:0.4 and about 1:70, and preferably between about 1:2 and about 1:35.

The compositions of our invention may be applied to plant crops in any desired manner. For example, the above composition may be used in solid form, by dusting, or in liquid form by spraying in aqueous solution.

When applied in the form of a dust, the mixture of peroxydisulfate and nitrogen-containing fertilizer may be mixed with any of several clay-type carriers such as fuller's earth, talc, bentonite, diatomaceous earth, and the like. Non-clay carriers may also be used, such as volcanic ash, calcium carbonate, lignocellulose, flour, and the like. Details of this method of application, such as requisite dust particle size, powder-consistency, methods of mixing and techniques of application are regarded as so well-known to those knowledgeable in the art, that further discussion thereof is deemed unnecessary.

When applying the compositions of our invention in liquid form, we have found water to be most generally useful solvent. For reasons of economy, the compositions of our invention, when used in aqueous form, are usually formulated so that they contain, respectively, about 2 to about 80 pounds of water-soluble peroxydisulfate and about 30 to about 140 pounds of nitrogen-containing fertilizer per 30 to 100 gallons of solution. These proportions correspond to solutions containing from about 10% to about 50% by weight of active ingredients.

The required amounts of the components which constitute the compositions of our invention will depend upon factors such as the degree of defoliation desired, the degree of maturity of the plants, and the like. For defoliation in which maximum "leaf drop" is desired, the compositions, whether used in dry or liquid form, should be applied at the rate of 2 to 200 pounds of active ingredient per acre of plants.

Our novel compositions may be employed either alone or in admixture with other modifying ingredients such as wetting agents (e.g., alkali metal soaps, fatty amines, arylalkyl sulfonates, etc.) and/or other adjuvants.

In addition to the advantages indicated earlier, our invention possesses further useful features not common to the desiccating and defoliating agents of the prior art. The compositions of our invention, despite the fact that they contain strongly oxidizing peroxydisulfate salts, are less of a fire, explosion, and corrosion risk than most other desiccating and defoliating agents now in use. Furthermore, our desiccating and defoliating agents retard leaf regrowth more effectively than do the peroxydisulfates and nitrogen-containing fertilizers when used individually. In this way, the effects of defoliation are extended over a longer period of time.

Yet another advantage of the compositions of our invention is that their ability to act both as desiccants and defoliants broadens their range of activity and reduces the chance of failure due to variation in the soil or plant environment or in the method of application.

The following examples are intended to illustrate the effectiveness and ease of application of the desiccating and defoliating agents of our invention. In no way do we intend the ancillary details contained therein to limit the spirit and scope of our invention, which is defined by the appended claims.

DESCRIPTION OF THE PREFERRED EMBODIMENTS

Example 1

A 5% aqueous solution of sodium nitrate was sprayed onto bean plants until their leaves were wet. A similar test was carried out in which the above solution also contained either 0.2% or 2% ammonium peroxydisulfate. Observations were made eight days after the solutions were applied and are summarized in the following table.

CONCENTRATION WT. (PERCENT)

| | | Percent | | |
|---|---|---|---|---|
| $NaNO_3$ | $(NH_4)_2S_2O_8$ | Desiccation | Defoliation | Regrowth |
| 5 | 0 | 60 | 30 | 80 |
| 5 | 0.2 | 80 | 60 | 80 |
| 5 | 2 | 90 | 90 | 30 |

This example demonstrates that the presence of ammonium peroxydisulfate in relatively small amounts enhances considerably the effectiveness of sodium nitrate as a desiccant and defoliant.

Example 2

Aqueous solutions containing 5 and 10 percent ammonium sulfate were prepared and sprayed onto bean plants until their leaves were wet. A similar test was carried out in which the 5 percent ammonium sulfate contained either 0.2 or 2% ammonium peroxydisulfate. Observations were made eight days after the solutions were applied and are summarized in the following table:

| Concentration, wt. (percent) | | Percent | | |
|---|---|---|---|---|
| $(NH_4)_2SO_4$ | $(NH_4)_2S_2O_8$ | Desiccation | Defoliation | Regrowth |
| 10 | 0 | 70 | 30 | 80 |
| 5 | 0 | 50 | 0 | 80 |
| 5 | 0.2 | 70 | 50 | 80 |
| 5 | 2 | 100 | 90 | 30 |

This example shows that when a relatively small amount of a peroxydisulfate is added to a solution of ammonium sulfate a more effective defoliating solution is obtained than when a much larger amount of ammonium sulfate is employed in the absence of the peroxydisulfate.

Example 3

"Uran–32," which is an aqueous solution containing about 45.1% by weight ammonium nitrate and about 34.8% by weight urea was used together with ammonium peroxydisulfate in the following test, in which five pots of bean plants were sprayed with the compositions listed below. The five treatments were applied at the rate of approximately 50 gallons per acre, and the results are summarized in the following table.

| | Treatment conditions | | | Percent leaf drop after 65 hours |
|---|---|---|---|---|
| Plot No. | $(NH_4)_2S_2O_8$ (pounds) | Water (gallons) | "Uran-32" (gallons) | |
| 1 | 0 | (*) | 20 | 20 |
| 2 | 40 | (*) | 0 | 20 |
| 3 | 80 | (*) | 0 | 60 |
| 4 | 40 | (*) | 20 | 80 |
| 5 | 80 | (*) | 20 | 100 |

* Sufficient water was added to give 50 gallons of treatment solution.

The data of this example show that ammonium peroxydisulfate per se and "Uran–32" fertilizer solution per se were not sufficiently effective as defoliants. However, the data also show that a true synergistic effect results from the combination of the peroxydisulfate with the fertilizer whereby more defoliation occurs than would be expected.

What is claimed is:

1. A method of desiccating and defoliating crop plants which comprises applying at a rate sufficient to cause desiccation and defoliation, a synergistic combination of a peroxydisulfate selected from the group consisting of ammonium peroxydisulfate, sodium peroxydisulfate and potassium peroxydisulfate, and a nitrogen fertilizer selected from the group consisting of sodium nitrate, ammonium sulfate, ammonium nitrate and urea, the proportion of said peroxydisulfate to said nitrogen fertilizer being about 1 part by weight to about 2 to 35 parts by weight of nitrogen fertilizer.

2. The method as claimed in claim 1 wherein the peroxydisulfate is ammonium peroxydisulfate and the combination of peroxydisulfate and nitrogen fertilizer is applied as an aqueous solution at the rate of 2 to 200 pounds of active ingredient per acre of plants.

3. The method as claimed in claim 2 wherein the combination of ammonium peroxydisulfate and nitrogen fertilizer is applied at a rate sufficient to achieve at least about 90% defoliation of the plants.

4. A plant desiccating and defoliating composition consisting of an aqueous solution of a synergistic combination of ammonium peroxydisulfate and a nitrogen fertilizer selected from the group consisting of sodium nitrate, ammonium sulfate, ammonium nitrate and urea, the proportion of said peroxydisulfate to said nitrogen fertilizer being about 1 part by weight to about 2 to 35 parts by weight of nitrogen fertilizer, the remainder being water, whereby there is provided a desiccating and defoliating composition so effective that it will achieve at least 90% defoliation when applied to plants at the rate of 2 to 200 pounds of active ingredient per acre of plants.

References Cited

Federal Register, 9002, July 16, 1965.

JAMES O. THOMAS, JR., Primary Examiner